United States Patent [19]

Yang

[11] Patent Number: 5,656,912
[45] Date of Patent: Aug. 12, 1997

[54] METHOD AND APPARATUS FOR CONTROLLING A MOTOR

[75] Inventor: Sheng Ming Yang, Taipei, Taiwan

[73] Assignee: A. O. Smith Corporation, Milwaukee, Wis.

[21] Appl. No.: 536,980

[22] Filed: Sep. 29, 1995

[51] Int. Cl.$^6$ .................................................. H02P 7/42
[52] U.S. Cl. ........................................ 318/808; 318/432
[58] Field of Search ................................... 318/432, 433, 318/810, 811, 599, 798–802, 807, 808

[56] References Cited

U.S. PATENT DOCUMENTS 4,965,504  10/1990  Ueda et al. ............................ 318/808
5,110,264   5/1992  Murry ............................... 318/432 X
5,506,486   4/1996  Hayashi et al. ....................... 318/808

Primary Examiner—Brian Sircus
Attorney, Agent, or Firm—James Earl Lowe, Jr.; Thomas A. Miller

[57] ABSTRACT

A controller for a motor having at least one stator phase and a method for controlling the motor, the controller including a drive signal generator for producing an electrical drive signal in the stator phase, the drive signal resulting in a current flow in the stator phase such that the current flow varies in response to varying load conditions for the motor, a current sensor for monitoring the current flow in the stator phase, an error detector for producing an error signal related to changes in the current flow, and a manipulation circuit electrically connected to the error detector and to the drive signal generator for changing the electrical stimulus in response to the error detector.

21 Claims, 2 Drawing Sheets

METHOD AND APPARATUS FOR CONTROLLING A MOTOR

BACKGROUND OF THE INVENTION

The invention relates to a controller for controlling a motor, and particularly to a controller for controlling an induction motor, and still more particularly to a controller for controlling an induction motor in a fluid pump.

It is known to provide an air handling system such as a heating, ventilating or air conditioning ("HVAC") system with a blower or fluid pump that either pushes air over or draws air across a heat exchanger or cooling coil to heat or cool the air, respectively, and transfer the air through a system of ducts and vents to a room or rooms where a thermostat is located. The thermostat provides feedback to the system to indicate the temperature in the room or rooms. In this way, the temperature of the air in those rooms is controlled. The blower includes a motor and the HVAC system usually also includes a controller for controlling the motor in response to various parameters such as room air temperature, air flow rate, motor speed, and motor torque.

It is also known that the efficiency of the heat transfer between the air and the heat exchanger or cooling coil is directly dependent upon the flow rate of air across the heat exchanger or the cooling coil. Moreover, it is known that the efficiency of the heat transfer process can be maximized by maintaining the flow rate at a specific set point. The set point or flow rate at which the heat transfer is most efficient is determined empirically (typically by the manufacturer of the HVAC system), and is programmed into the thermostat of the system. As vents in the system are opened or closed, however, the load on the motor changes, thereby changing the motor speed, blower output and stator current. The changing loads experienced by the motor make precise control of the blower output extremely difficult.

Many techniques for controlling the air flow rate of a blower in an HVAC system have been developed and have consistently revolved around the use of a permanent magnet brushless d.c. motor. Permanent magnet brushless d.c. motors have been used because they are relatively easy to control and provide good performance in low power air handling applications. However, permanent magnet brushless d.c. motors are typically more expensive and less rugged than other types of motors such as induction motors. One known method of controlling a permanent magnet brushless d.c. motor is shown and described in U.S. Pat. No. 4,978,896.

SUMMARY OF THE INVENTION

Accordingly, the invention provides a method and apparatus for controlling a motor, and particularly a method and apparatus for controlling an induction motor in an HVAC system to provide performance comparable with that of a permanent magnet brushless d.c. motor at a lower cost. The motor has at least one stator phase and a controller is provided for supplying electrical energy to the stator phase such that the mechanical output generated by the motor is substantially constant regardless of any variations in the load on the motor. The controller can be used to control any motor in any application where it is desired to maintain a constant mechanical output regardless of variations in the load on the motor. Such applications may include, as in the preferred embodiment of the invention, a fluid pump for maintaining a constant fluid flow in spite of varying load conditions. The invention is not, however, limited to fluid pumps. The invention could also be applied, for example, to a conveyor drive motor for maintaining a constant conveyor speed in response to varying load conditions.

The controller includes drive signal means for producing an electrical drive signal in the stator phase resulting in a current flow in the stator phase such that the current flow varies in response to varying load conditions for the motor, means for monitoring the current flow in the stator phase, change signal means for producing a change signal related to changes in the current flow, and manipulation means electrically connected to the change signal means and to the drive signal means for changing the electrical drive signal in response to the change signal means.

The invention also provides a method for controlling a motor having at least one stator phase, the method including the steps of producing an electrical drive signal in the stator phase resulting in a current flow in the stator phase such that the current flow varies in response to varying load conditions for the motor, monitoring the current flow in the stator phase, producing a change signal related to changes in the current flow, and changing the electrical drive signal in response to the change signal means.

It is a principal advantage of the invention to provide a fluid pump for an HVAC system that provides substantially constant fluid flow irrespective of variations in the load on the fluid pump.

It is another advantage of the invention to provide a fluid pump utilizing an induction motor and a controller for the induction motor for generating a substantially constant fluid flow irrespective of load variations.

It is another advantage of the invention to provide a controller for an induction motor which controller changes the torque of the motor solely in response to stator current.

It is another advantage of the invention to provide a method for controlling an induction motor in a fluid pump to provide a substantially constant fluid flow irrespective of load variations on the motor.

Other features and advantages of the invention are set forth in the detailed description and claims.

Figure 1:
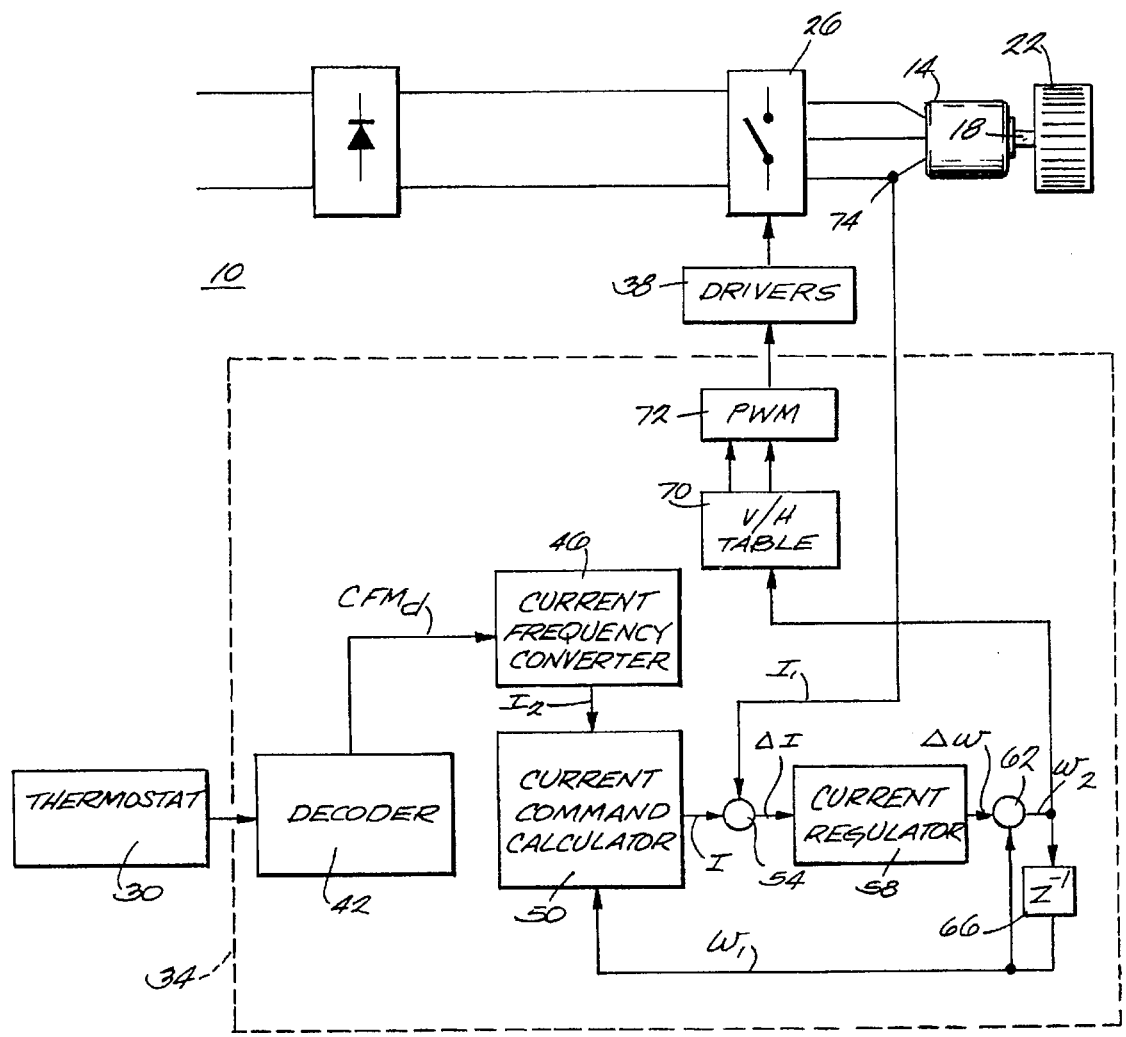
FIG. 1 is a schematic diagram of the motor controller and a motor controlled by the controller.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Schematically illustrated in FIG. 1 of the drawings is a motor controller 10 and a motor 14. While the controller can be used to control any motor in any application, the motor of the preferred embodiment is a three phase induction motor employed in a fluid pump. More particularly, the fluid pump of the preferred embodiment is a blower for use in an HVAC system. As stated above, in HVAC systems, it has been shown that the efficiency of heat transfer between the heat exchanger or cooling coil and the air crossing over the heat exchanger or cooling coil is directly dependent upon the flow rate of the air passing across the heat exchanger or cooling coil. Moreover, it has been determined that the efficiency of the heat exchange is maximized at a specific air flow rate (usually determined by the design characteristics of the heating element or cooling coil).

The motor 14 includes a stator (not shown) having three phase windings, and a rotor (not shown) mounted for rotation about a rotor axis (also not shown). As is commonly known in the art, energization of the stator phases causes rotation of the rotor. The motor 14 also includes an arbor 18 connected to the rotor for rotation therewith. An impeller or blower fan 22 is mounted on the arbor 18 so that as the fan 22 rotates, air is drawn over or forced over the heat exchange unit (not shown) and from there is delivered to a system of ducts (not shown) for distributing the air to a room or rooms. A series of switches 26 selectively electrically connect the motor 14 to electrical power (typically direct current derived from standard alternating current line voltage) in response to control signals produced by the controller 10.

The controller 10 includes a thermostat 30 that is located within the room or rooms to be heated or cooled. The thermostat 30 monitors the room air temperature and generates, in response to the room air temperature, control signals for initiating operation of the motor 14.

The controller 10 also includes a microprocessor 34 connected to the thermostat 30 to receive therefrom the thermostat control signals. The microprocessor 34 is also connected to the switches 26 supplying power to the motor 14 to control the switches 26 and energize the motor 14 so that the fan 22 delivers a constant flow rate volume of air despite any change in the load conditions experienced by the motor 14. Typically, such load changes occur as vents in the duct system are opened or closed. As is commonly known in the art, a series of drivers 38 are connected between the power switches 26 and the microprocessor 34.

The microprocessor 34 includes a decoder 42 for receiving the thermostat control signals and includes drive signal means or energizing means connected to the decoder 42 for producing an electrical drive signal or electrical stimulus resulting in current flow in the stator phase. While various means for producing the electrical drive signal are appropriate, the drive signal means of the preferred embodiment includes a current convertor 46 connected to the decoder 42 and a current command calculator 50 connected to the current convertor 46.

The microprocessor also includes change signal means for producing a change signal related to changes in stator current flow. While various means for generating the change signal are appropriate, in the preferred embodiment the change signal means includes a comparator 54 connected to the current command calculator 50.

The microprocessor also includes manipulation means connected to the comparator and to the drive signal means for changing the electrical drive signal in response to the output from the comparator 54. While various means for changing the electrical drive signal are appropriate, the manipulation means of the preferred embodiment includes a current regulator or integrator 58 connected to the comparator 54 and a summation node 62 connected to the current regulator 58.

The summation node 62 has an output which is fed back through a delay element 66 to an input of the summation node 62 and to the current command calculator 50. The output of summation node 62 is also connected to a frequency-to-voltage convertor 70. A pulse width modulator 72 is connected to the frequency-to-voltage convertor 70. The pulse width modulator 72 is connected to the switch drivers 38 to output signals thereto and selectively connect the phases of the motor 14 to electrical power.

The controller 10 also includes monitoring means for monitoring the current flow in the stator phase. Any known means for monitoring or measuring the stator current is appropriate. In the preferred embodiment, the monitoring means is a current sensor 74 connected to at least one of the motor phases to detect motor phase current. The current sensor 74 is connected to the comparator 54 to transmit the phase current to the comparator 54. In operation, the microprocessor 34 controls the motor 14 using the relationship between stator current, stator frequency and air flow rate shown in FIG. 2. This relationship has been empirically determined and, as clearly shown in FIG. 2, for a given air flow rate, the stator current versus the stator frequency relationship is generally linear, i.e., can be defined by the linear equation:

$$y=mx+b;$$

where

- y=desired stator command current for current time period (I);
- x=stator command frequency for previous time period ($\omega_1$);
- m=slope of current frequency curve (the slope is determined by the blower characteristics, for example, cage size, number of blades, etc.); and
- b=the zero frequency or steady state no-load stator current ($I_2$).

By knowing the desired air flow rate at which the HVAC system is to operate, the zero frequency stator current $I_2$ at that air flow rate and the stator command frequency $\omega_1$ for the previous time period, the microprocessor 34 can easily calculate the desired stator command current I at which the motor 14 must be energized to generate the desired air flow rate output. If the desired stator command current I differs from the actual stator current $I_1$, then the stator command frequency $\omega_1$ can be adjusted to compensate for the difference, which is assumed to be the result of a change in the load on the motor 14. In a broad sense, the controller can be used to control any motor where the relationship between the electrical signal used to energize the motor and the output of the motor is known.

Figure 4:
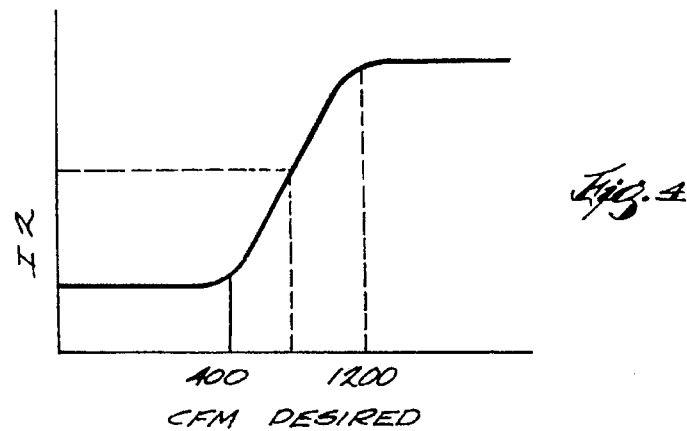
FIG. 4 is a graphical illustration showing the relationship between the desired fluid flow rate and the corresponding motor energization current.

More specifically, and referring to FIG. 1, the decoder 42 receives the thermostat inputs and generates in response to the thermostat inputs an output that is indicative of a desired cubic feet per minute flow output ($CFM_{desired}$) for the motor blower. The current convertor 46 receives the $CFM_{desired}$ signal and generates in response to the $CFM_{desired}$ signal the zero frequency stator current value ($I_2$). The current convertor 46 can generate $I_2$ using a real time calculation, however, in the preferred embodiment, the current convertor 46 is simply a memory based look-up table that stores a separate zero frequency stator current value for a number of different flow rates. The relationship between $CFM_{desired}$ and $I_2$ is shown in FIG. 4. The current convertor 46 transmits the zero frequency stator current to the current command calculator 50.

Figure 2:
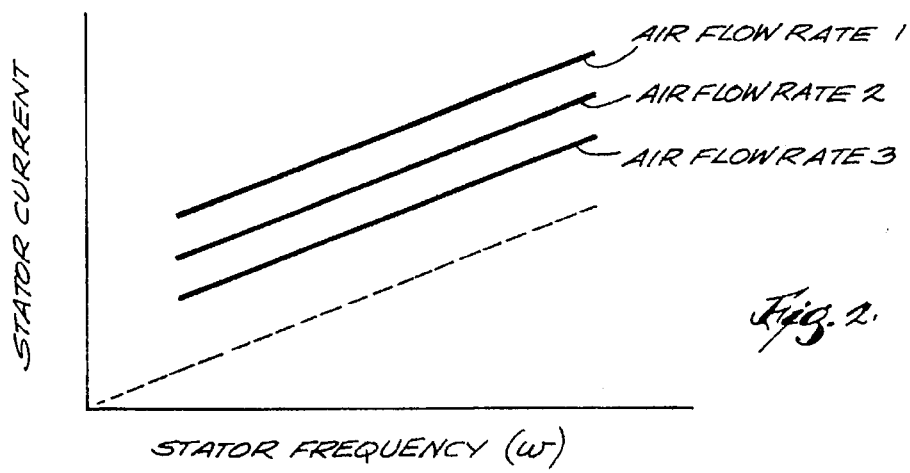
FIG. 2 is a graphical illustration showing the relationship between the stator current and the frequency of the electrical stimulus used to energize the motor.

At approximately the same time, the command frequency $\omega_1$, i.e., the command frequency from the previous 0.6 second time period, is fed back to the current command calculator 50 from the output of the summation node 62. In response to receipt of the zero frequency stator current $I_2$ and the command frequency signal $\omega_1$, the current command calculator 50 generates a command current I, i.e., the current at which the motor 14 should be energized for a given blower output. As stated above, the relationship used for this determination is shown in FIG. 2.

The command current I is fed to the comparator 54 and compared against the actual phase current $I_1$ as measured by the current sensor 74. The current comparator 54 outputs a current error value ($\Delta I$) that represents the difference between the actual stator phase current $I_1$ and the desired stator phase current $I_2$ for the desired air flow rate $CFM_{desired}$.

Figure 3:
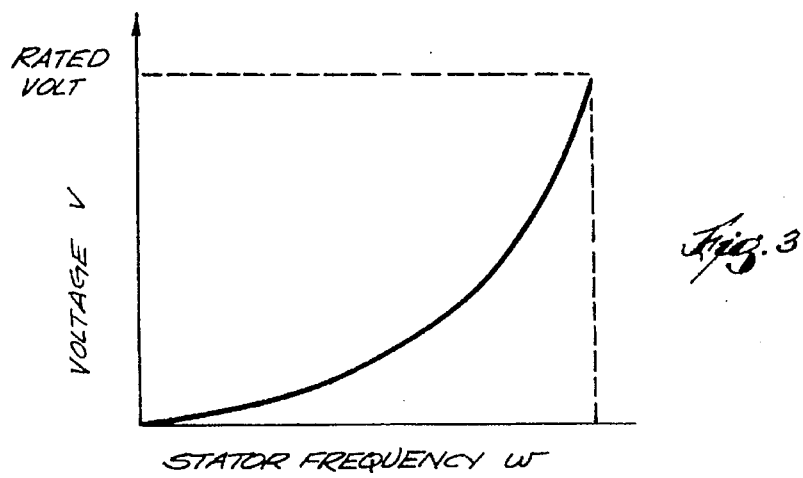
FIG. 3 is a graphical illustration showing the relationship between the stator voltage and the frequency of the electrical stimulus.

The current error ($\Delta I$) is transmitted to current regulator 58 which integrates the current error signal $\Delta I$ to generate a manipulation output ($\Delta \omega$). The manipulation output $\Delta \omega$ is added to the previous command frequency $\omega_1$ to generate an updated command frequency $\omega_2$. The updated command frequency $\omega_2$ represents an updated frequency signal which is required at existing motor current $I_1$ to maintain the desired blower air flow rate output $CFM_{desired}$. The command frequency $\omega_2$ is transmitted to the frequency-to-voltage convertor 70 which generates an updated command voltage. The frequency-to-voltage convertor 70 uses the relationship shown in FIG. 3 to generate the command voltage and this voltage is input to the pulse width modulator 72 along with the updated command frequency. The function performed by the frequency-to-voltage convertor 70 can be conducted by using a real time software based calculation based on the equation:

$$V = K_v \omega_2 \sqrt{\omega_2}$$

where V is the updated command voltage, $K_v$ is a constant to convert the frequency units to a voltage units, and $\omega_2$ is the command frequency. In the preferred embodiment, the results of the function are precalculated and, like the functions of the current convertor 46 and the current command calculator 50, the frequency-to-voltage convertor function is stored in a memory based look-up table. The command frequency ($\omega_2$) is also fed back to the current command calculator 50 through the delay element 66 which causes a transmission delay of approximately 0.6 seconds. This period of delay is to account for the fact that the load in the HVAC system changes slowly as the vents are opened or closed and the delay prevents instability of the controller.

In response to the updated command frequency $\omega_2$ and the updated command voltage V, the pulse width modulator 72 generates control signals for the drivers 38 which operate the switches 26 to generate an updated current output for the motor 14 to maintain the desired air flow rate output. The current sensor 74 will continue to measure the stator phase current. If the blower motor load remains the same from one 0.6 second interval to the next, then the stator phase current $I_1$ will not change, and there will be no resulting current error signal $\Delta I$ generated. As a result, the command frequency $\omega_2$ output at the summation node 62 will not change. Alternatively, if the blower motor load changes from one 0.6 second interval to the next, then a new current error signal $\Delta I$ will be generated to cause a recalculation of the command frequency $\omega_2$ as described above. Various features and advantages of the invention are set forth in the following claims:

I claim:

1. A voltage controller for an induction motor having at least one stator phase, said controller comprising:

drive signal means for producing an electrical drive signal in said stator phase as a function of a motor driving frequency resulting in a current magnitude in said stator phase such that said current magnitude varies in response to varying load conditions for said motor;

monitoring means for monitoring said current magnitude in said stator phase;

means for calculating a current reference as a function of a motor driving frequency and a desired motor speed, change signal means electrically connected to said monitoring means and to said current reference calculating means for producing a change signal related to the difference between said current magnitude in said stator phase and said current reference; and manipulation means electrically connected to said change signal means and to said drive signal means for producing a motor driving frequency for said drive signal means which varies in magnitude in response to said change signal.

2. A controller for a motor as set forth in claim 1 wherein said change signal means produces said change signal solely in response to changes in said current magnitude.

3. A controller for a motor as set forth in claim 1 wherein said electrical drive signal is a drive frequency and voltage.

4. A controller for a motor as set forth in claim 1 wherein said motor has a mechanical output and wherein said controller energizes said motor so that said mechanical output is substantially constant regardless of said varying load conditions.

5. A controller for a motor as set forth in claim 1 wherein said manipulation means is connected to said drive signal means and to said change signal means through a closed loop feedback path.

6. A controller for a motor as set forth in claim 1 wherein said motor is a three phase induction motor.

7. A controller for a motor as set forth in claim 1 wherein said manipulation means changes said electrical drive signal periodically.

8. A controller for a motor as set forth in claim 1 wherein said manipulation means changes said electrical drive signal approximately every 0.6 seconds.

9. A fluid pump for generating a fluid flow, said fluid pump comprising: an induction motor having at least one stator phase and being exposed to varying load conditions; and a voltage controller for supplying electrical energy to said stator phase such that said fluid flow is substantially constant regardless of said varying load conditions, said controller including monitoring means for monitoring current magnitude in said stator phase, drive signal means for producing an electrical drive signal in said stator phase as a function of a motor driving frequency resulting in a current magnitude in said stator phase such that said current magnitude varies in response to varying load conditions for said motor;

means for calculating a current reference as a function of a motor driving frequency and a desired motor speed, change signal means electrically connected to said monitoring means and to said current reference calculating means for producing a variable change signal related to the difference between said current magnitude in said stator phase and said current reference; and manipulation means electrically connected to said change signal means and to said drive signal means for producing a motor driving frequency for said drive signal means which varies in magnitude in response to said change signal.

10. A fluid pump as set forth in claim 9 wherein said motor includes an arbor mounted for rotation about an axis and a fluid impeller mounted on said arbor so that rotation of said arbor causes movement of said fluid.

11. A fluid pump as set forth in claim 10 wherein said fluid pump is a blower in an HVAC system.

12. A fluid pump as set forth in claim 9 wherein said manipulation means changes said motor driving frequency solely in response to changes in said current magnitude.

13. A fluid pump as set forth in claim 9 wherein said electrical stimulus is a drive frequency and voltage.

14. A fluid pump as set forth in claim 9 wherein said manipulation means is connected to said energizing means and to said monitoring means through a closed loop feedback path.

15. A fluid pump as set forth in claim 9 wherein said motor is a three phase induction motor.

16. A controller for a motor as set forth in claim 9 wherein said manipulation means changes said electrical stimulus periodically.

17. A controller for a motor as set forth in claim 9 wherein said manipulation means changes said electrical stimulus approximately every 0.6 seconds.

18. A method for controlling an induction motor having at least one stator phase, said method comprising the steps of:

(A) producing an electrical drive signal in said stator phase as a function of a motor driving frequency resulting in a current magnitude in said stator phase such that said current magnitude varies in response to varying load conditions for said motor;

(B) monitoring said current magnitude in said stator phase;

(C) calculating a current reference as a function of a motor driving frequency and a desired motor speed, (D) producing a change signal related to the difference between said current magnitude in said stator phase and said current reference; and (E) producing a motor driving frequency for said drive signal means which varies in magnitude in response to said change signal.

19. A method as set forth in claim 18 wherein said step (C) further includes the step of producing said change signal periodically to provide continuous control of said motor.

20. A method as set forth in claim 18 wherein said step (C) further includes the step of producing said change signal approximately every 0.6 seconds to provide continuous control of said motor.

21. A method as set forth in claim 18 wherein said step (A) includes the step of calculating a desired stator current, and wherein said step (C) includes the step of calculating the difference between said desired stator current and said monitored stator current.

* * * * *